(12) United States Patent
Liu et al.

(10) Patent No.: US 10,001,879 B2
(45) Date of Patent: Jun. 19, 2018

(54) METHOD AND DEVICE OF OPTIMIZING SIGNAL-TO-NOISE RATIO PARAMETER

(71) Applicants: BOE TECHNOLOGY GROUP CO., LTD., Beijing (CN); ORDOS YUANSHENG OPTOELECTRONICS CO., LTD., Ordos, Inner Mongolia (CN)

(72) Inventors: Lina Liu, Beijing (CN); Kwang-Gyun Jang, Beijing (CN)

(73) Assignees: BOE TECHNOLOGY GROUP CO., LTD., Beijing (CN); ORDOS YUANSHENG OPTOELECTORNICS CO., LTD., Ordos, Inner Mongolia (CN)

( * ) Notice: Subject to any disclaimer, the term of this patent is extended or adjusted under 35 U.S.C. 154(b) by 0 days. days.

(21) Appl. No.: 15/122,169

(22) PCT Filed: Sep. 30, 2015

(86) PCT No.: PCT/CN2015/091188
§ 371 (c)(1),
(2) Date: Aug. 27, 2016

(87) PCT Pub. No.: WO2016/145825
PCT Pub. Date: Sep. 22, 2016

(65) Prior Publication Data
US 2017/0075490 A1   Mar. 16, 2017

(30) Foreign Application Priority Data

Mar. 17, 2015  (CN) .......................... 2015 1 0117890

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
CPC ................................ G06F 3/0418; G06F 3/44
See application file for complete search history.

(56) References Cited

U.S. PATENT DOCUMENTS

2012/0013546 A1\* 1/2012 Westhues ................ G06F 3/044
345/173
2012/0306801 A1\* 12/2012 Rai ........................ G06F 3/0416
345/174

(Continued)

FOREIGN PATENT DOCUMENTS

CN   102693055 A   9/2012
CN   103765354 A   4/2014

(Continued)

OTHER PUBLICATIONS

English translation of Box V of the Written Opinion from PCT Application Serial No. PCT/CN2015/091188, dated Dec. 3, 2015.

(Continued)

*Primary Examiner* — Sahlu Okebato
(74) *Attorney, Agent, or Firm* — Kinney & Lange, P.A.

(57) ABSTRACT

The present disclosure discloses a method and a device of optimizing a SNR parameter. The method of optimizing the SNR parameter comprises: obtaining a capacitance signal of a touch screen without being touched and a capacitance signal of the touch screen being touched, respectively; filtering the capacitance signal of the touch screen without being touched to obtain a first filtered capacitance signal; filtering the capacitance signal of the touch screen being touched to obtain a second filtered capacitance signal; calculating an average value of the first filtered capacitance signal in a single period and an average value of the second filtered capacitance signal in the single period; compensat- (Continued)

ing the average value of the first filtered capacitance signal or the average value of the second filtered capacitance signal; and determining the SNR parameter, according to a ratio of the compensated average value of the second filtered capacitance signal to the average value of the first filtered capacitance signal, or according to a ratio of the average value of the second filtered capacitance signal to the compensated average value of the first filtered capacitance signal. The method and the device of optimizing the SNR parameter are used for optimizing the SNR parameter applied to a touch screen, solving a problem of low accuracy of identifying a touch action by the touch screen.

16 Claims, 11 Drawing Sheets

(56) References Cited

U.S. PATENT DOCUMENTS

| 2013/0063396 A1 | 3/2013 | Kim et al. |
| 2013/0106436 A1 | 5/2013 | Brunet et al. |
| 2013/0300690 A1 | 11/2013 | Yang et al. |
| 2015/0103043 A1* | 4/2015 | Hills ............... G06F 3/044 345/174 |

FOREIGN PATENT DOCUMENTS

| CN | 104346008 A | 2/2015 |
| CN | 104679375 A | 6/2015 |
| WO | WO2014160425 A1 | 10/2014 |

OTHER PUBLICATIONS

International Search Report and Written Opinion from PCT Application Serial No. PCT/CN2015/091188, dated Dec. 3, 2015, 10 pages.

First Chinese Office Action, for Chinese Patent Application No. 201510117890.9, dated May 2, 2017, 5 pages.

Extended European Search Report dated Jan. 16, 2018, for corresponding European Application No. 15885197.2.

\* cited by examiner

METHOD AND DEVICE OF OPTIMIZING SIGNAL-TO-NOISE RATIO PARAMETER

TECHNICAL FIELD

The present disclosure relates to the field of touch screen technology, and in particular, to a method and a device of optimizing a signal-to-noise ratio (SNR) parameter.

BACKGROUND

With development of the touch screen technology, more and more electronic device is provided with a touch screen nowadays. When a finger of a user is touching the touch screen, a noise signal may be received by the touch screen, besides an operation signal from the finger of the user being received. A SNR parameter represents a ratio of the operation signal to the noise signal in the touch screen. Thus, the SNR parameter is one of important indices for evaluating performance of the touch screen. The higher a value of the SNR parameter is, the higher an accuracy of identifying a touch action on the touch screen to which the SNR parameter is applied is. In conventional solutions, a drive integrated circuit (hereinafter referred to as a drive IC) of the touch screen calculates based on a obtained capacitance signal of the touch screen by a standard deviation algorithm, a root-mean-square algorithm (RMS) algorithm or a peak-to-peak algorithm to obtain the SNR parameter.

However, inventors found during a test process that the value of the SNR parameter calculated by the algorithm, such as the standard deviation algorithm, the RMS algorithm or the peak-to-peak algorithm, is lower, and thus the accuracy of identifying the touch action on the touch screen is lower.

SUMMARY

An object of the present disclosure is to provide a method and a device of optimizing a SNR parameter, so as to increase the SNR parameter applied to the touch screen, thereby improving the accuracy of identifying the touch action on the touch screen.

In order to achieve the above object, the present disclosure provides technical solutions as follows.

In an aspect of the present disclosure, a method of optimizing a signal-to-noise ratio SNR parameter is provided. The method comprises:

obtaining a capacitance signal of a touch screen without being touched and a capacitance signal of the touch screen being touched, respectively;

filtering the capacitance signal of the touch screen without being touched to obtain a first filtered capacitance signal;

filtering the capacitance signal of the touch screen being touched to obtain a second filtered capacitance signal;

calculating an average value of the first filtered capacitance signal in a single period and an average value of the second filtered capacitance signal in the single period;

compensating the average value of the first filtered capacitance signal or the average value of the second filtered capacitance signal; and determining the SNR parameter, according to a first ratio of the compensated average value of the second filtered capacitance signal to the average value of the first filtered capacitance signal and a correspondence between the first ratio and the SNR parameter, or according to a second ratio of the average value of the second filtered capacitance signal to the compensated average value of the first filtered capacitance signal and a correspondence between the second ratio and the SNR parameter.

In another aspect of the present disclosure, a device for optimizing a signal-to-noise ratio SNR parameter is provided. The device comprises:

a signal obtaining unit, configured to obtain a capacitance signal of a touch screen without being touched and a capacitance signal of the touch screen being touched, respectively;

a first filtering unit, configured to filter the capacitance signal of the touch screen without being touched to obtain a first filtered capacitance signal;

a second filtering unit, configured to filter the capacitance signal of the touch screen being touched to obtain a second filtered capacitance signal;

a calculation unit, configured to calculate an average value of the first filtered capacitance signal in a single period and an average value of the second filtered capacitance signal in the single period;

a compensation unit, configured to compensate the average value of the first filtered capacitance signal or the average value of the second filtered capacitance signal; and a determination unit, configured to determine the SNR parameter, according to a first ratio of the compensated average value of the second filtered capacitance signal to the average value of the first filtered capacitance signal and a correspondence between the first ratio and the SNR parameter, or according to a second ratio of the average value of the second filtered capacitance signal to the compensated average value of the first filtered capacitance signal and a correspondence between the second ratio and the SNR parameter.

In the method and the device of optimizing the SNR parameter provided in the present disclosure, the capacitance signal of the touch screen without being touched and the capacitance signal of the touch screen being touched are filtered respectively, so as to eliminate spike noise in the capacitance signal of the touch screen without being touched and spike noise in the capacitance signal of the touch screen being touched, which causes the filtered capacitance signal to be smoother; then the average value of the filtered capacitance signal of the touch screen without being touched or the average value of the filtered capacitance signal of the touch screen being touched is compensated, so as to increase the average value of the filtered capacitance signal of the touch screen being touched or decrease the average value of the filtered capacitance signal of the touch screen without being touched, thereby increasing the SNR parameter, and thus improving accuracy of identifying the touch action by the touch screen.

BRIEF DESCRIPTION OF THE DRAWINGS

The drawings illustrated here are used for further explanation of the present disclosure, which constitute a part of the present disclosure. Exemplary embodiments of the present disclosure and explanation thereof are used for illustrating the present disclosure, but do not constitute any inappropriate limitations on the present disclosure. In the drawings.

DETAILED DESCRIPTION

Hereinafter, a method and a device of optimizing a SNR parameter provided by embodiments of the present disclosure will be described in detail with reference to the drawings.

First Embodiment

Figure 1:
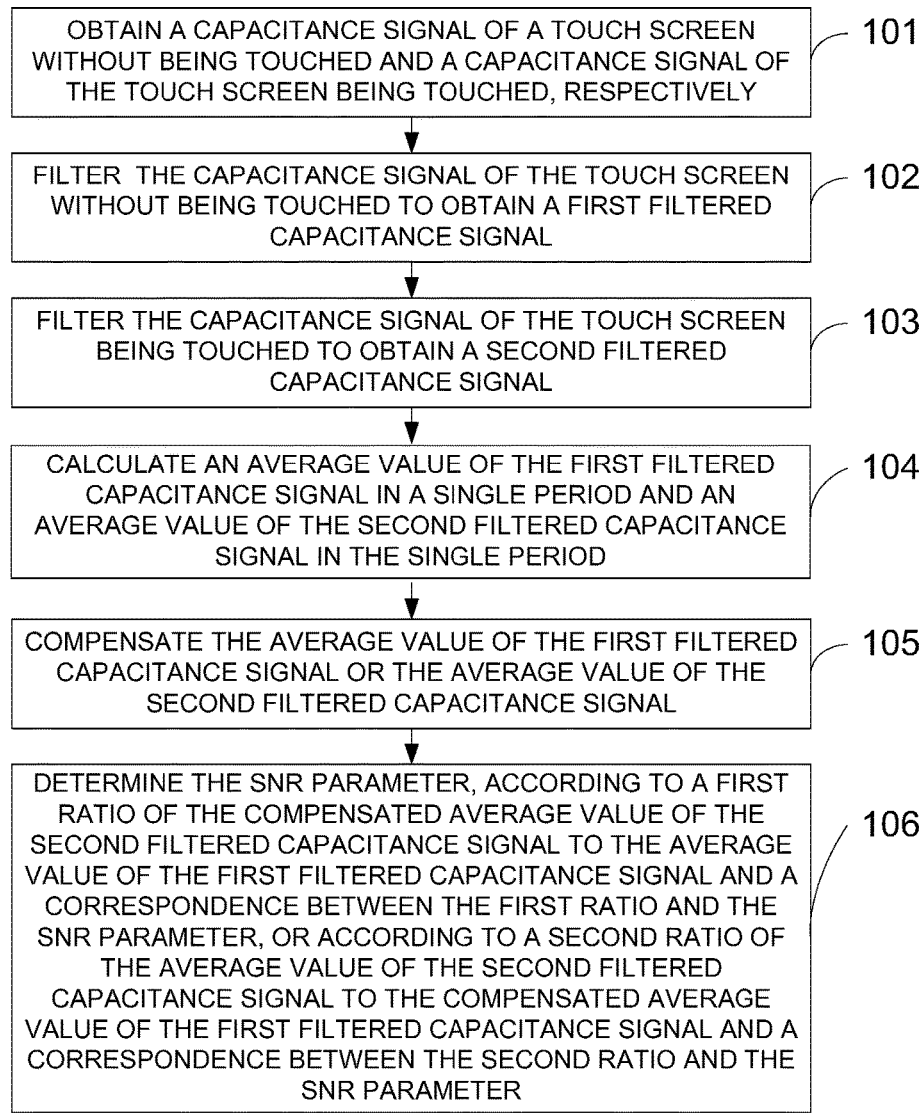
FIG. 1 is a flowchart of a method of optimizing a SNR parameter according to an embodiment of the present disclosure.

With reference to FIG. 1, a method of optimizing a SNR parameter provided by an embodiment of the present disclosure comprises steps 101 to 106.

In step 101, a capacitance signal of a touch screen without being touched and a capacitance signal of the touch screen being touched are obtained respectively. The capacitance signal of the touch screen without being touched mainly includes a noise signal. The capacitance signal of the touch screen being touched mainly includes a noise signal and an operation signal corresponding to a touch.

In step 102, the capacitance signal of the touch screen without being touched is filtered to obtain a first filtered capacitance signal. The capacitance signal of the touch screen without being touched may be input to a filter for filtering, and the filtered capacitance signal of the touch screen without being touched may be used as the first filtered capacitance signal.

In step 103, the capacitance signal of the touch screen being touched is filtered to obtain a second filtered capacitance signal. The capacitance signal of the touch screen being touched may be input to a filter for filtering, and the filtered capacitance signal of the touch screen being touched may be used as the second filtered capacitance signal.

In step 104, an average value of the first filtered capacitance signal and an average value of the second filtered capacitance signal in a single period are calculated. In particular, each of the first filtered capacitance signal and the second filtered capacitance signal is a segment of continuous and varying capacitance signal. Therefore, the average value of the first filtered capacitance signal and the average value of the second filtered capacitance signal may be obtained periodically by setting a period during which the average value of the first filtered capacitance signal and the average value of the second filtered capacitance signal are obtained. A length of the period may be determined according to actual situations or with reference to experiences. Within the single period, both a magnitude of the first filtered capacitance signal and a magnitude of the second filtered capacitance signal are varied with time. A drive IC of the touch screen may obtain the first filtered capacitance signal in the single period and the second filtered capacitance signal in the single period, so as to calculate the average value of the first filtered capacitance signal and the average value of the second filtered capacitance signal in the single period.

In step 105, the average value of the first filtered capacitance signal or the average value of the second filtered capacitance signal is compensated. In particular, a compensation parameter of the average value of the first filtered capacitance signal or a compensation parameter of the average value of the second filtered capacitance signal may be adjusted for compensating the average value of the first filtered capacitance signal or the average value of the second filtered capacitance signal.

In step 106, the SNR parameter is determined according to a first ratio of the compensated average value of the second filtered capacitance signal to the average value of the first filtered capacitance signal and a correspondence between the first ratio and the SNR parameter, or according to a second ratio of the average value of the second filtered capacitance signal to the compensated average value of the first filtered capacitance signal and a correspondence between the second ratio and the SNR parameter. In particular, the ratio, i.e., the first ratio, of the compensated average value of the second filtered capacitance signal to the average value of the first filtered capacitance signal may be calculated. The SNR parameter is obtained according to the correspondence between the first ratio and the SNR parameter. Alternatively, the ratio, i.e., the second ratio, of the average value of the second filtered capacitance signal to the compensated average value of the first filtered capacitance signal may be calculated. The SNR parameter is obtained according to the correspondence between the second ratio and the SNR parameter. The correspondence between the first ratio and the SNR parameter and the correspondence between the second ratio and the SNR parameter may particularly be a SNR parameter calculation formula. For example, SNR=10 lg (P1/P2), where SNR indicates a SNR parameter, P1 indicates an efficient power of an operation signal, P2 is an efficient power of a noise signal, and P1/P2 is equivalent to a first ratio or a second ratio. In another example, SNR=20 lg (V1/V2), where SNR indicates a SNR parameter, V1 indicates an efficient voltage of an operation signal, V2 is an efficient voltage of a noise signal, and V1/V2 is equivalent to a first ratio or a second ratio. Preferably, SNR=20 lg (V1/V2) is used in the embodiments of the present disclosure.

In the method of optimizing the SNR parameter provided in the present disclosure, the capacitance signal of the touch screen without being touched and the capacitance signal of the touch screen being touched are filtered respectively, so as to eliminate spike noise in the capacitance signal of the touch screen without being touched and spike noise in the capacitance signal of the touch screen being touched, which causes the filtered capacitance signal to be smoother; then the average value of the filtered capacitance signal of the touch screen without being touched or the average value of the filtered capacitance signal of the touch screen being touched is compensated, so as to increase the average value of the filtered capacitance signal of the touch screen being touched or decrease the average value of the filtered capacitance signal of the touch screen without being touched, thereby increasing the SNR parameter, and thus improving accuracy of identifying the touch action by the touch screen.

Second Embodiment

Figure 2:
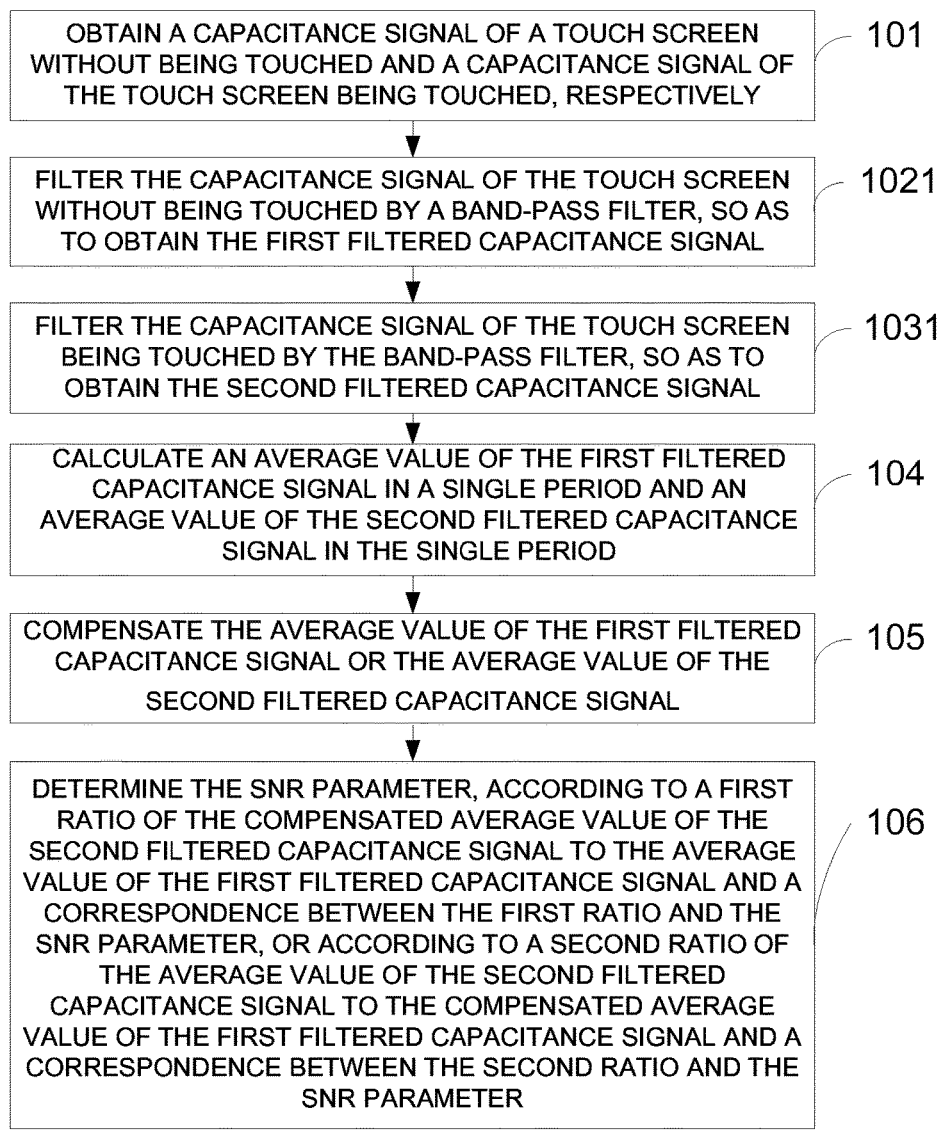
FIG. 2 is a flowchart of a particular implementation of a method of optimizing a SNR parameter according to an embodiment of the present disclosure.

Preferably, in order to further eliminate the spike noise in the capacitance signal of the touch screen without being touched and the spike noise in the capacitance signal of the touch screen being touched, a band-pass filter is used in the present embodiment for filtering. Based on the first embodiment, step 102 may be refined to step 1021, and step 103 may be refined to step 1031, which are shown in FIG. 2.

In step 1021, the capacitance signal of the touch screen without being touched is filtered by a band-pass filter, so as to obtain the first filtered capacitance signal. A band-pass frequency band of the band-pass filter may be set according to preset desired performance of the touch screen, so as to filter the spike noise out, reducing an effect of the noise on the SNR parameter to some extent thereby further increasing a value of the SNR parameter.

Figure 3:
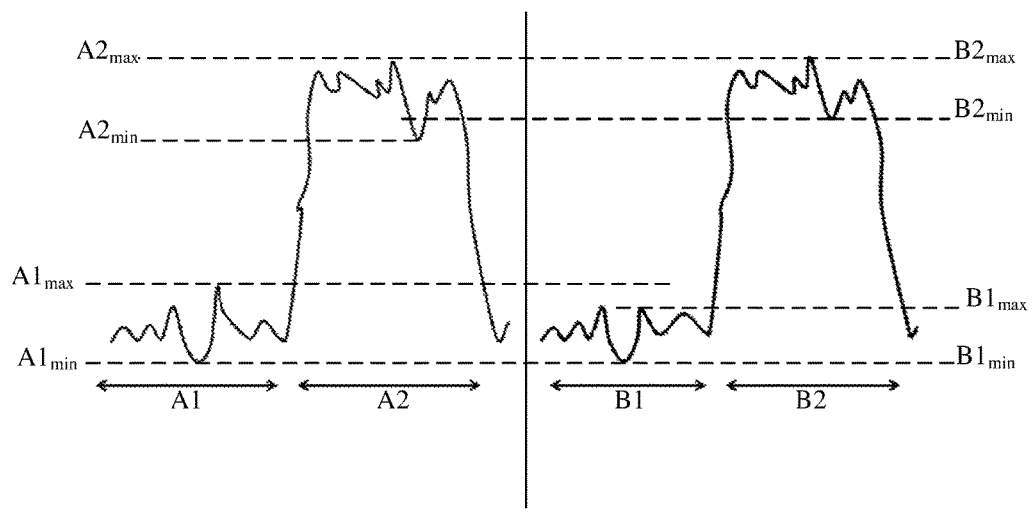
FIG. 3 is a schematic diagram of a capacitance signal without being filtered v.s. a filtered capacitance signal according to an embodiment of the present disclosure.

In step 1031, the capacitance signal of the touch screen being touched is filtered by the band-pass filter, so as to obtain the second filtered capacitance signal. Description of step 1031 may refer to that of step 1021 as previously discussed. With reference to FIG. 3, waveform variation of capacitance signals before and after being filtered may be shown in connection with waveform diagrams of the capacitance signal of the touch screen without being touched, the capacitance signal of the touch screen being touched, the first filtered capacitance signal and the second filtered capacitance signal. As shown in FIG. 3, left to a vertical line shows a waveform of the capacitance signal without being filtered, right to the vertical line shows a waveform of the filtered capacitance signal, A1 represents a waveform of the capacitance signal of the touch screen without being touched, A2 represents a waveform of the capacitance signal of the touch screen being touched, B1 represents a waveform of the first filtered capacitance signal, B2 represents a waveform of the second filtered capacitance signal, A1max is a maximum value of the capacitance signal of the touch screen without being touched, A1min is a minimum value of the capacitance signal of the touch screen without being touched, A2max is a maximum value of the capacitance signal of the touch screen being touched, A2min is a minimum value of the capacitance signal of the touch screen being touched, B1max is a maximum value of the filtered capacitance signal of the touch screen without being touched, i.e., a maximum value of the first filtered capacitance signal in the single period, B1min is a minimum value of the filtered capacitance signal of the touch screen without being touched, i.e., a minimum value of the first filtered capacitance signal in the single period, B2max is a maximum value of the filtered capacitance signal of the touch screen being touched, i.e., a maximum value of the second filtered capacitance signal in the single period, and B2min is a minimum value of the filtered capacitance signal of the touch screen being touched, i.e., a minimum value of the second filtered capacitance signal in the single period. As can be seen from FIG. 3, the maximum value B1max of the first filtered capacitance signal in the single period is less than the maximum value A1max of the capacitance signal, before being filtered, of the touch screen without being touched. A peak of the spike noise of the capacitance signal of the touch screen without being touched is filtered out in the filtering process. The minimum value B2min of the second filtered capacitance signal in the single period is larger than the mini value A2min of the capacitance signal, before being filtered, of the touch screen being touched. A trough of the spike noise of the capacitance signal of the touch screen being touched is filtered out in the filtering process.

Third Embodiment

Figure 4:
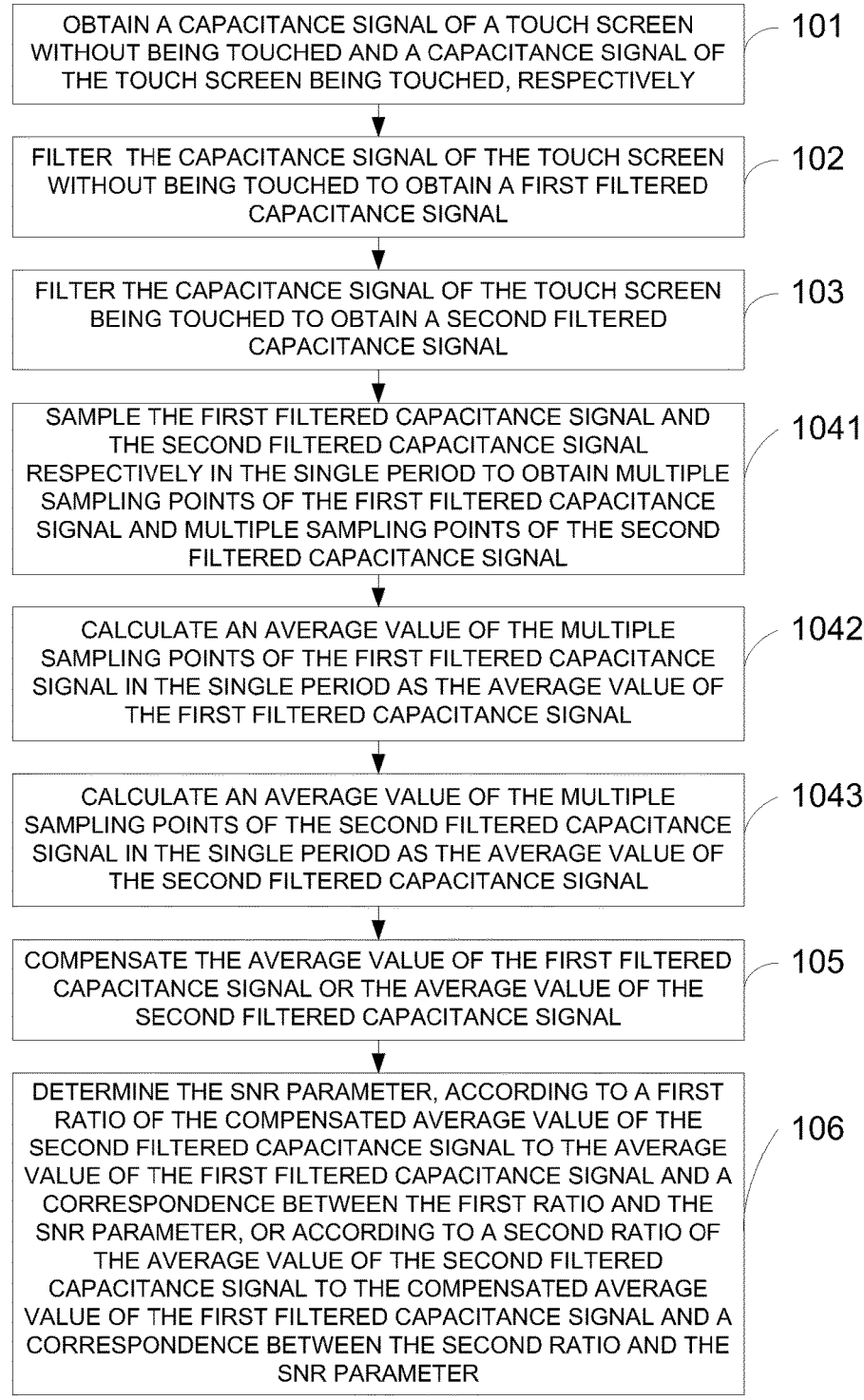
FIG. 4 is a flowchart of another particular implementation of a method of optimizing a SNR parameter according to an embodiment of the present disclosure.

Based on the first embodiment, how to calculate the average value of the first filtered capacitance signal and the average value of the second filtered capacitance signal will be described in detailed below. With reference to FIG. 4, step 104 may be refined to steps 1041-1043.

In step 1041, the first filtered capacitance signal and the second filtered capacitance signal are sampled respectively in the single period to obtain multiple sampling points of the first filtered capacitance signal and multiple sampling points of the second filtered capacitance signal.

In step 1042, an average value of the multiple sampling points of the first filtered capacitance signal in the single period is calculated as the average value of the first filtered capacitance signal. It should be noted that as shown in FIG. 3, since the maximum value B1max of the first filtered capacitance signal is less than the maximum value A1max of the capacitance signal, before being filtered, of the touch screen without being touched, the average value of the first filtered capacitance signal is less than the average value of the capacitance signal, before being filtered, of the touch screen without being touched, and thus the effect of the noise part on the SNR parameter may be reduced efficiently.

In step 1043, an average value of the multiple sampling points of the second filtered capacitance signal in the single period is calculated as the average value of the second filtered capacitance signal. It should be noted that as shown in FIG. 3, since the minimum value B2min of the second filtered capacitance signal is larger than the minimum value A2min of the capacitance signal, before being filtered, of the touch screen being touched, the average value of the second filtered capacitance signal is less than the average value of the capacitance signal, before being filtered, of the touch screen being touched, and thus the effect of the noise part on the SNR parameter may be reduced efficiently.

Fourth Embodiment

Further, based on the first embodiment, there may be a plurality of approaches of compensating the average value of the first filtered capacitance signal or the average value of the second filtered capacitance signal. Hereinafter, three compensation methods and corresponding methods of calculating the SNR parameter will be described in detail.

Figure 5:
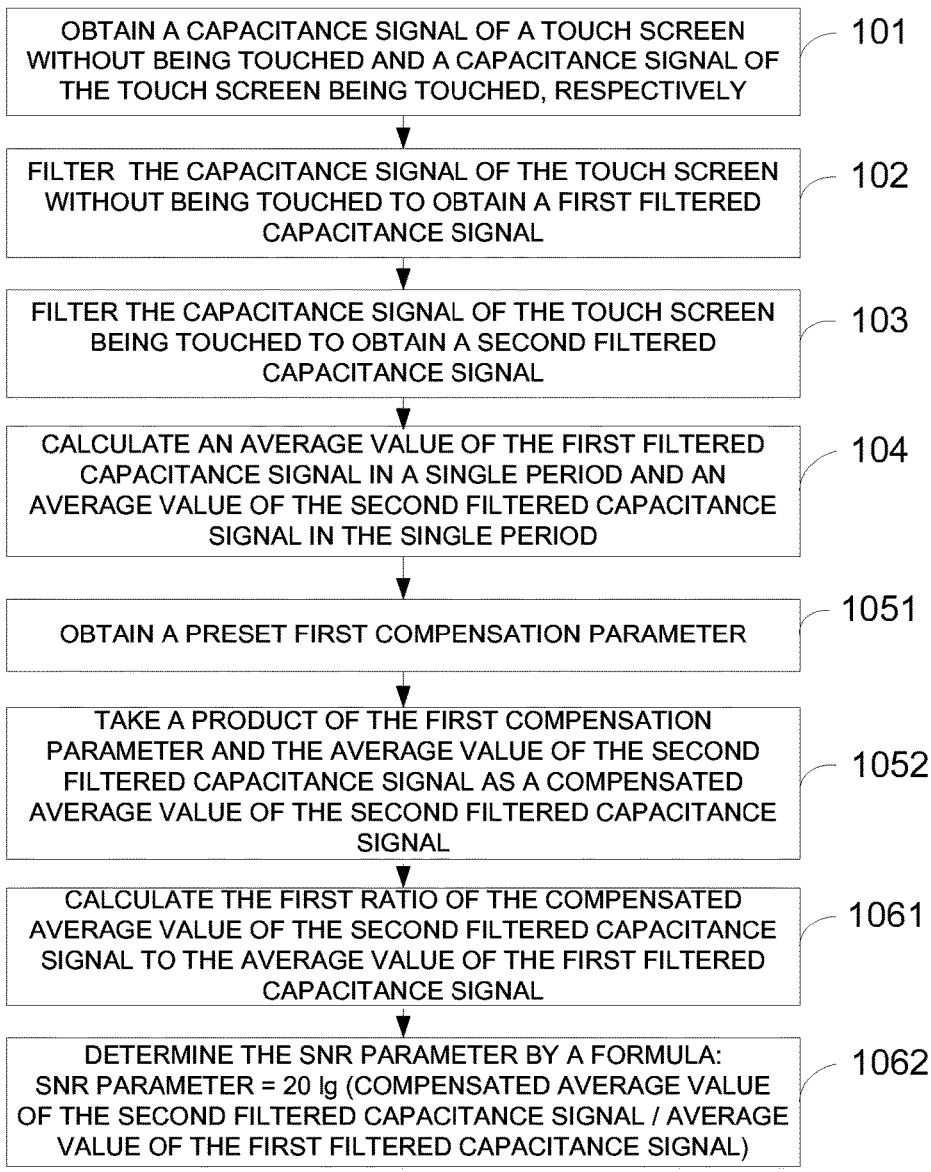
FIGS. 5 and 6 are flowcharts of particular implementations of a method of optimizing a SNR parameter according to an embodiment of the present disclosure.
Figure 6:
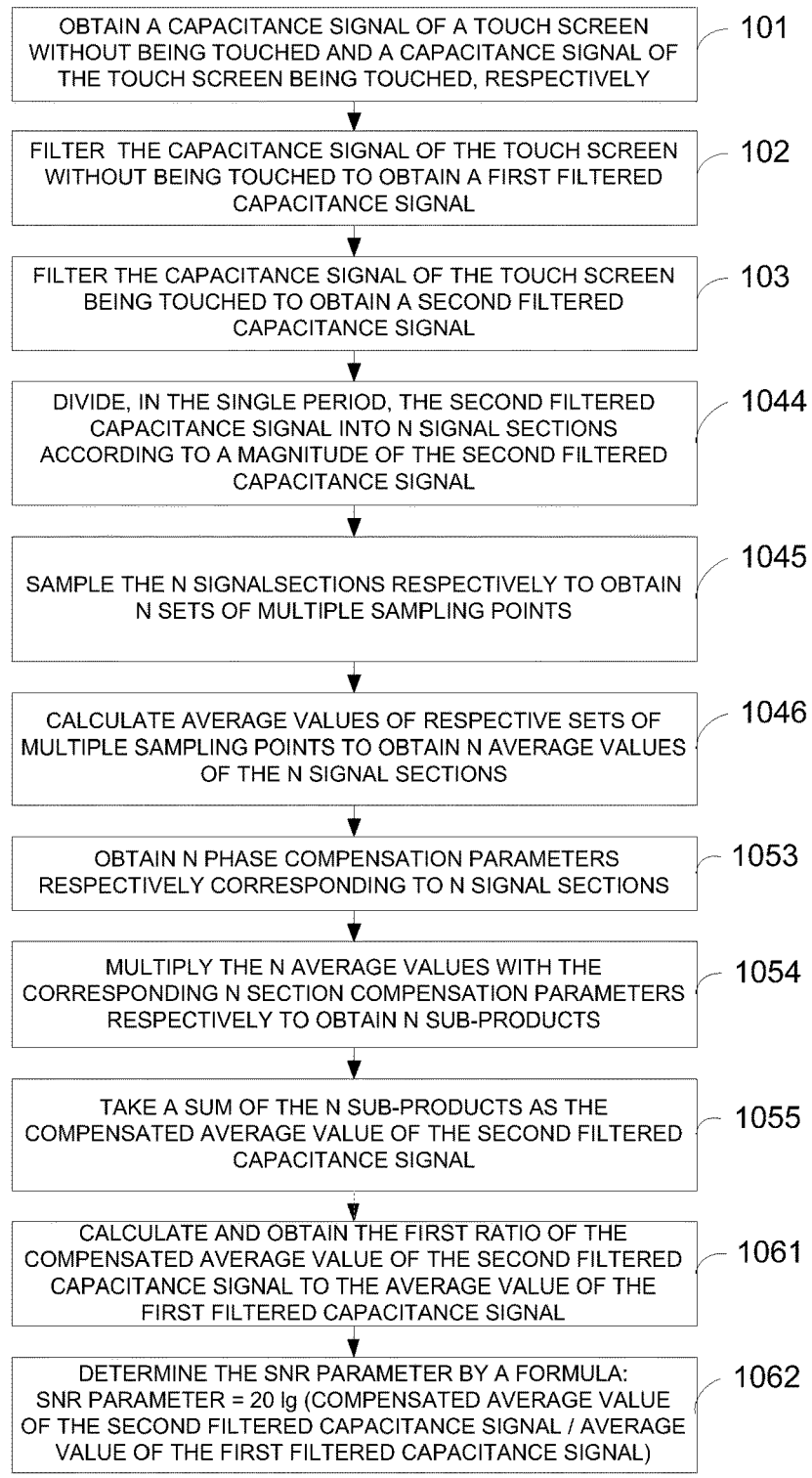

A first way is to use a compensation method with a compensation parameter. In particular, with reference to FIG. 5, the average value of the second filter capacitance signal is compensated. Step 105 may be refined to steps 1051 and 1052.

In step 1051, a preset first compensation parameter is obtained, the first compensation parameter being no less than 1.

In step 1052, a product of the first compensation parameter and the average value of the second filtered capacitance signal is used as the compensated average value of the second filtered capacitance signal. The first compensation parameter is larger than 1, so that the compensated average value of the second filtered capacitance signal is increased compared to the average value of the second filtered capacitance signal without being compensated, and thus the value of the SNR parameter is increased.

In particular, the SNR parameter may be calculated using the average value of the first filtered capacitance signal and the compensated average value of the second filtered capacitance signal. Step 106 may be refined to steps 1061 and 1062.

In step 1061, the first ratio of the compensated average value of the second filtered capacitance signal to the average value of the first filtered capacitance signal is calculated.

In step 1062, the SNR parameter is determined using a formula:

$$\text{SNR parameter} = 20\ \lg(\text{compensated average value of the second filtered capacitance signal}/\text{average value of the first filtered capacitance signal}).$$

For example, the average value of the first filtered capacitance signal is 1 dB, the average value of the second filtered capacitance signal is 20 dB and the first compensation parameter is 5, then the SNR parameter SNR=20 lg [(20*5)/1]=40. With the first compensation parameter, the average value of the second filtered capacitance signal is increased, and thus the SNR parameter is increased.

A second way is to use a section compensation method. The compensation method is to compensate on different signal sections. Thus, it is required to divide the second filtered capacitance signal into a plurality of signal sections, so as to calculate the average value of the second filtered capacitance signal. In particular, step 104 may be refined to steps 1044-1046.

In step 1044, in the single period, the second filtered capacitance signal is divided into N signal sections according to a magnitude of the second filtered capacitance signal, in which N is a positive integer larger than 1.

In step 1045, the N signal sections are sampled respectively to obtain N sets of multiple sampling points.

Figure 7:
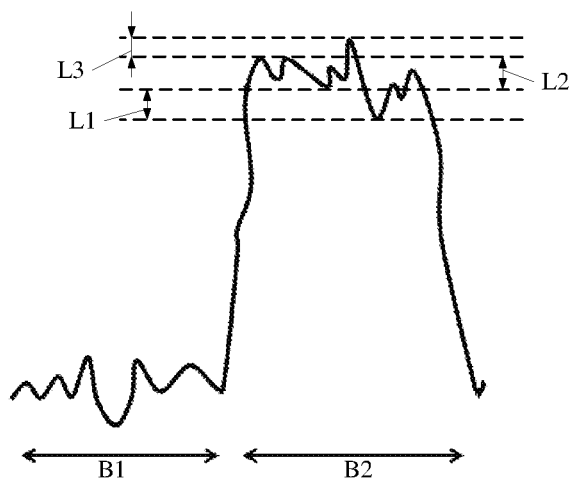
FIG. 7 is a schematic diagram of corresponding divided signal sections in FIG. 6.

In step 1046, average values of respective sets of multiple sampling points are calculated to obtain N average values of the N signal sections. In particular, as shown in FIG. 7, B1 represents the waveform of the first filtered capacitance signal, and B2 represents the waveform of the second filtered capacitance signal. According to the magnitude of the second filtered capacitance signal, the second filtered capacitance signal is divided into a first signal section L1, a second signal section L2 and a third signal section L3; the first signal section L1, the second signal section L2 and the third signal section L3 are sampled respectively to obtain multiple sampling points of first signal section L1, multiple sampling points of the second signal section L2 and multiple sampling points of the third signal section L3; an average value of the multiple sampling points of first signal section L1, an average value of the multiple sampling points of the second signal section L2 and an average value of the multiple sampling points of the third signal section L3 are respectively used as an average value of the first signal section L1, an average value of the second signal section L2 and an average value of the third signal section L3.

It should be noted that a particular method of obtaining the average value of the first filtered capacitance signal may refer to steps 1041 to 1043, the description thereof will be omitted here for simplicity.

Accordingly, the step 105 of compensating the average value of the second filtered capacitance signal may be refined to steps 1053 to 1055.

In step 1053, N section compensation parameters respectively corresponding to N signal sections are obtained. Each of the signal sections corresponds to one of the section compensation parameters, wherein each of the N section compensation parameters is no less than 1. In particular, the section compensation parameters may be set by experiences. Alternatively, a desired value of the average value of the compensated average value of the second filtered capacitance signal is preset, and the section compensation parameters may be set according to the desired value, respective signal sections and the algorithm of calculating the compensated average value of the second filtered capacitance signal.

In step 1054, the N average values are multiplied with the corresponding N section compensation parameters respectively to obtain N sub-products. For example, the average value of the first signal section is multiplied with the section compensation parameter corresponding to the first signal section to obtain a first sub-product corresponding to the first signal section; the average value of the second signal section is multiplied with the section compensation parameter corresponding to the second signal section to obtain a second sub-product corresponding to the second signal section; and so on, until the average value of the N-th signal section is multiplied with the section compensation parameter corresponding to the N-th signal section to obtain a N-th sub-product corresponding to the N-th signal section. For example, as shown in FIG. 7, N=3, then the average value Z1 of the first signal section L1 is multiplied with the section compensation parameter weight1 corresponding to the first signal section L1 to obtain the first sub-product; the average value Z2 of the second signal section L2 is multiplied with the section compensation parameter weight2 corresponding to the second signal section L2 to obtain the second sub-product; and the average value Z3 of the third signal section L3 is multiplied with the section compensation parameter weight1 corresponding to the third signal section L3 to obtain the third sub-product.

In step 1055, a sum of the N sub-products is used as the compensated average value of the second filtered capacitance signal. For example, N=3, then the compensated average value of the second filtered capacitance signal is Z1*weight1+Z2*weight2+Z3*weight3.

In particular, the SNR parameter may be calculated by using the average value of the first filtered capacitance signal, the compensated average value of the second filtered capacitance signal and a formula of calculating the SNR parameter. Step 106 may be refined to steps 1061 and 1062, and description thereof may refer to those of steps 1061 and 1062 in the first way as previously discussed.

A third way is to use an average value compensation method. In particular, with reference to FIG. 8, the average value of the first filtered capacitance signal is compensated. Step 105 may be refined to steps 1058 and 1059.

In step 1058, a preset second compensation parameter is obtained, the second compensation parameter being no larger than 1.

In step 1059, the second compensation parameter is multiplied with the average value of the first filtered capacitance signal to obtain a second product as the compensated average value of the first filtered capacitance signal. For example, the average value of the first filtered capacitance signal is 1 dB, the second compensation parameter is 0.2, and the compensated average value of the first filtered capacitance signal (i.e., the second product) is 1 dB*0.2=0.2 dB.

Figure 8:
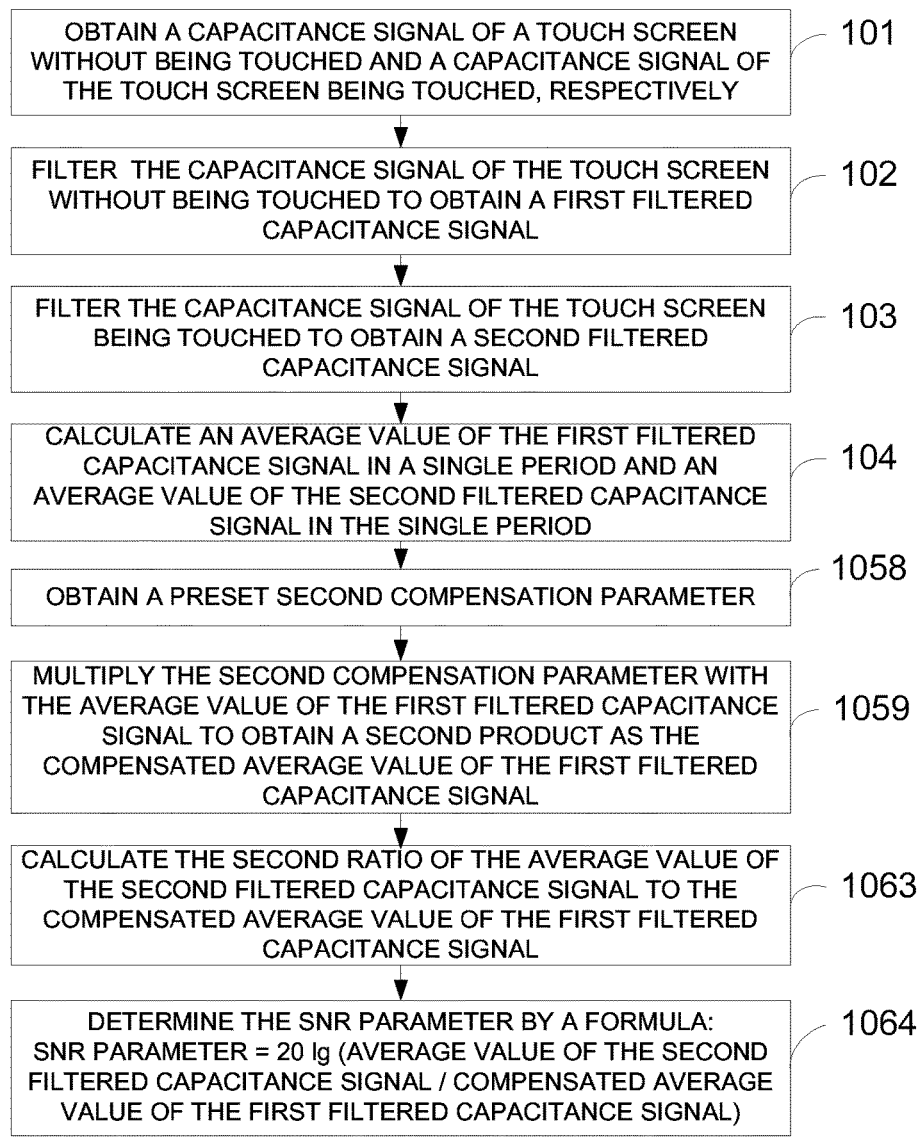
FIG. 8 is a flowchart of another particular implementation of a method of optimizing a SNR parameter according to an embodiment of the present disclosure.

In particular, the SNR parameter may be calculated by using the average value of the second filtered capacitance signal, the compensated average value of the first filtered capacitance signal and the formula of calculating the SNR parameter. Step 106 may be refined to steps 1063 and 1064, as shown in FIG. 8.

In step 1063, the second ratio of the average value of the second filtered capacitance signal to the compensated average value of the first filtered capacitance signal is calculated.

In step 1064, the SNR parameter is determined according to a formula:

$$\text{SNR parameter} = 20 \lg(\text{average value of the second filtered capacitance signal/compensated average value of the first filtered capacitance signal}).$$

For example, the average value of the first filtered capacitance signal is 1 dB, the average value of the second filtered capacitance signal is 20 dB and the second compensation parameter is 0.2, then the SNR parameter SNR=20 lg [(20/(1*0.2)/1]=40. With the second compensation parameter, the average value of the first filtered capacitance signal is decreased, and thus the SNR parameter is increased.

Figure 9:
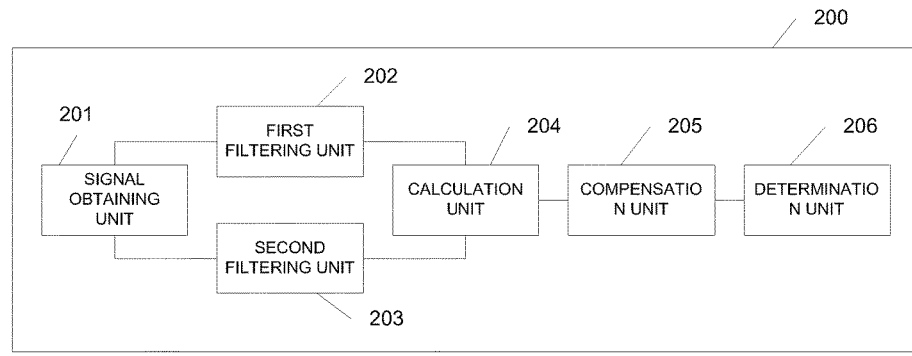
FIG. 9 is a structure schematic diagram of a device for optimizing a SNR parameter according to an embodiment of the present disclosure.

With reference to FIG. 9, a device 200 for optimizing a SNR parameter is provided by an embodiment of the present disclosure, which is corresponding to the first embodiment. The device 200 comprises a signal obtaining unit 201, a first filtering unit 202, a second filtering unit 203, a calculation unit 204, a compensation unit 205 and a determination unit 206.

The signal obtaining unit 201 is configured to obtain a capacitance signal of a touch screen without being touched and a capacitance signal of the touch screen being touched, respectively.

The first filtering unit 202 is configured to filter the capacitance signal of the touch screen without being touched to obtain a first filtered capacitance signal.

The second filtering unit 203 is configured to filter the capacitance signal of the touch screen being touched to obtain a second filtered capacitance signal.

The calculation unit 204 is configured to calculate an average value of the first filtered capacitance signal in a single period and an average value of the second filtered capacitance signal in the single period.

The compensation unit 205 is configured to compensate the average value of the first filtered capacitance signal or the average value of the second filtered capacitance signal; and The determination unit 206 is configured to determine the SNR parameter, according to a first ratio of the compensated average value of the second filtered capacitance signal to the average value of the first filtered capacitance signal and a correspondence between the first ratio and the SNR parameter, or according to a second ratio of the average value of the second filtered capacitance signal to the compensated average value of the first filtered capacitance signal and a correspondence between the second ratio and the SNR parameter.

In the device for optimizing the SNR parameter provided in the present disclosure, the capacitance signal of the touch screen without being touched and the capacitance signal of the touch screen being touched are filtered respectively, so as to eliminate spike noise in the capacitance signal of the touch screen without being touched and spike noise in the capacitance signal of the touch screen being touched, which causes the filtered capacitance signal to be smoother; then the average value of the filtered capacitance signal of the touch screen without being touched or the average value of the filtered capacitance signal of the touch screen being touched is compensated, so as to increase the average value of the filtered capacitance signal of the touch screen being touched or decrease the average value of the filtered capacitance signal of the touch screen without being touched, thereby increasing the SNR parameter, and thus improving accuracy of identifying the touch action by the touch screen.

Figure 10:
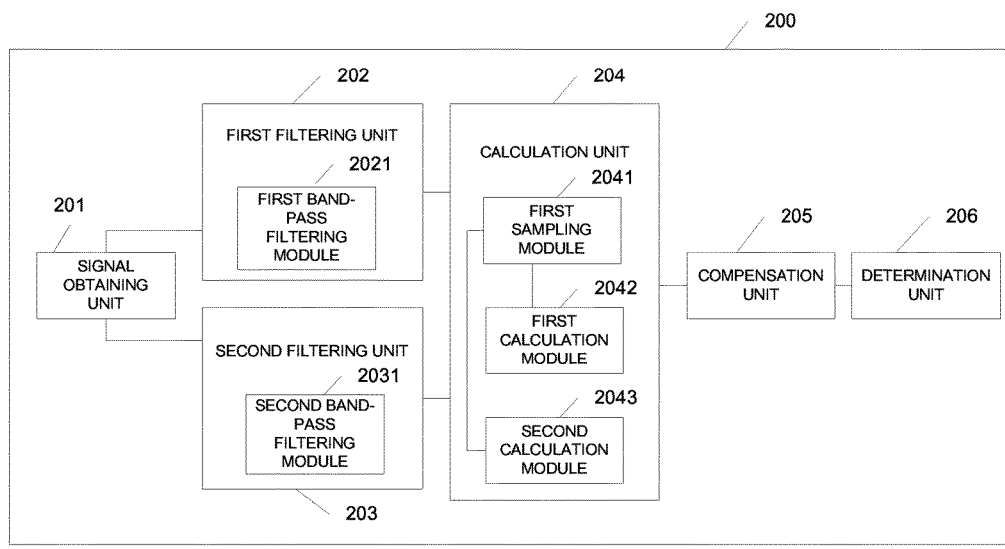
FIG. 10 is a structure schematic diagram of a particular implementation of a device for optimizing a SNR parameter according to an embodiment of the present disclosure.

In particular, corresponding to the second embodiment, the first filtering unit 202 in the above embodiment comprises a first band-pass filtering module 2021, as shown in FIG. 10, in order to further eliminate the spike noise in the capacitance signal.

The first band-pass filtering module 2021 is configured to filter the capacitance signal of the touch screen without being touched by a band-pass filter, so as to obtain the first filtered capacitance signal.

Similarly, the second filtering unit 203 in the above embodiment comprises a second band-pass filtering module 2031.

The second band-pass filtering module 2031 is configured to filter the capacitance signal of the touch screen being touched by the band-pass filter, so as to obtain the second filtered capacitance signal.

Further, corresponding to the third embodiment, the calculation unit 204 samples the first filtered capacitance signal and the second filtered capacitance signal, and calculates according to the sampling points obtained in the sampling process to obtain the average value of the first filtered capacitance signal and the average value of the second filtered capacitance signal. The calculation unit 204 comprises a first sampling module 2041, a first calculation module 2042 and a second calculation module 2043.

The first sampling module 2041 is configured to sample the first filtered capacitance signal and the second filtered capacitance signal respectively in the single period to obtain multiple sampling points of the first filtered capacitance signal and multiple sampling points of the second filtered capacitance signal.

The first calculation module 2042 is configured to calculate an average value of the multiple sampling points of the first filtered capacitance signal in the single period as the average value of the first filtered capacitance signal.

The second calculation module 2043 is configured to calculate an average value of the multiple sampling points of the second filtered capacitance signal in the single period as the average value of the second filtered capacitance signal.

Figure 11:
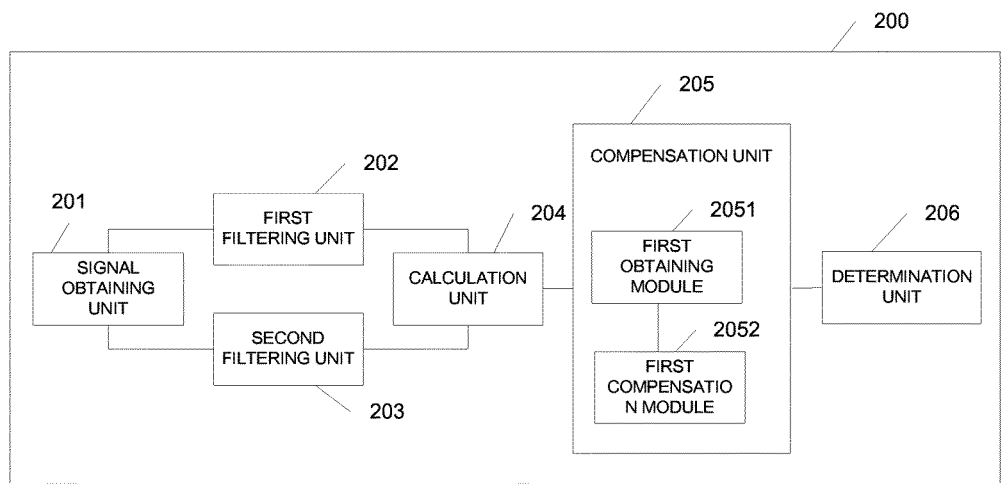
FIGS. 11, 12 and 13 are structure schematic diagrams of other particular implementations of a device for optimizing a SNR parameter according to an embodiment of the present disclosure.

In particular, corresponding to the first way in the fourth embodiment, the compensation unit 205 comprises a first obtaining module 2051 and a first compensation module 2052, as shown in FIG. 11, in order to increase the compensated average value of the second filtered capacitance signal and thus to increase the SNR parameter.

The first obtaining module 2051 is configured to obtain a preset first compensation parameter, the first compensation parameter being no less than 1.

The first compensation module 2052 is configured to take a product of the first compensation parameter and the average value of the second filtered capacitance signal as the compensated average value of the second filtered capacitance signal.

Figure 12:
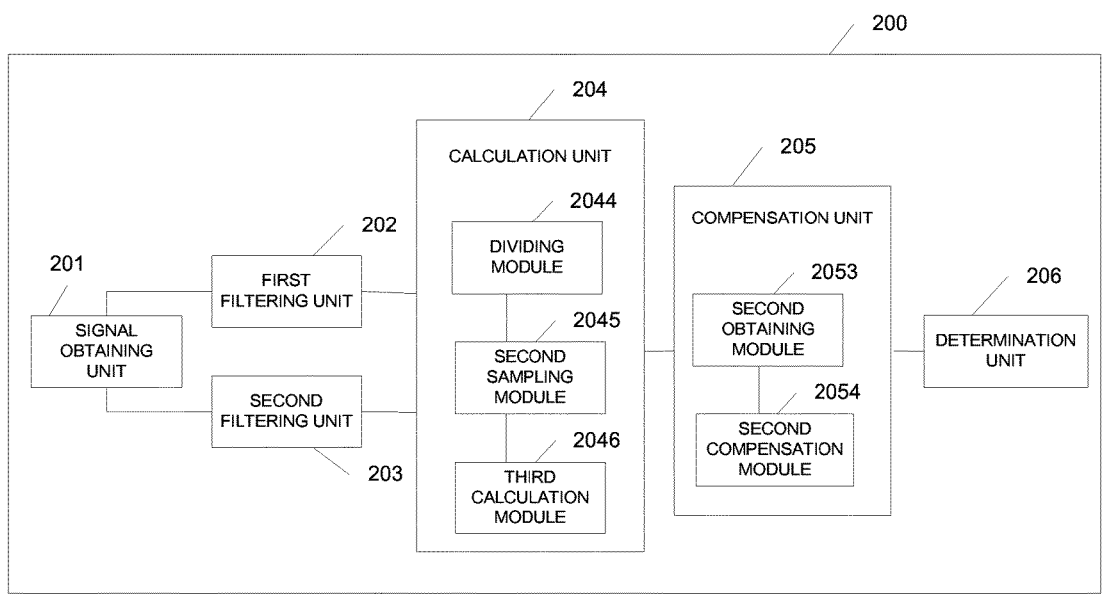

Alternatively, corresponding to the second way in the fourth embodiment, the calculation unit 204 is required to divide the second filtered capacitance signal into a plurality of signal sections. As shown in FIG. 12, the calculation unit 204 comprises a dividing module 2044, a second sampling module 2045 and a third calculation module 2046.

The dividing module 2044 is configured to divide, in the single period, the second filtered capacitance signal into N signal sections according to a magnitude of the second filtered capacitance signal, in which N is a positive integer larger than 1.

The second sampling module 2045 is configured to sample the N signal sections respectively to obtain N sets of multiple sampling points.

The third calculation module 2046 is configured to calculate average values of respective sets of multiple sampling points to obtain N average values of the N signal sections.

Accordingly, the compensation unit 205 needs to compensate the average value of each of the signal sections. As shown in FIG. 12, the compensation unit 205 comprises a second obtaining module 2053 and a second compensation module 2054.

The second obtaining module is configured to obtain N section compensation parameters respectively corresponding to N signal sections, wherein each of the N section compensation parameters is no less than 1.

The second compensation module 2054 is configured to multiply the N average values with the corresponding N section compensation parameters respectively to obtain N sub-products; and take a sum of the N sub-products as the compensated average value of the second filtered capacitance signal.

Figure 13:
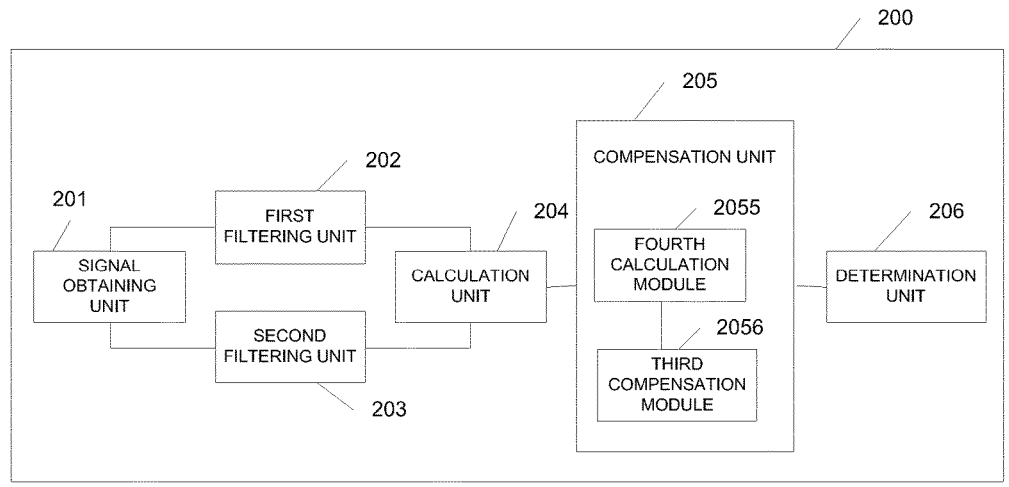

Alternatively, corresponding to the third way in the fourth embodiment, the compensation unit 205 comprises a third obtaining module 2055 and a third compensation module 2056, as shown in FIG. 13, in order to reduce the compensated average value of the first filtered capacitance signal, and thus to increase the SNR parameter.

The third obtaining module 2055 is configured to obtain a preset second compensation parameter, the second compensation parameter being no larger than 1.

The third compensation module 2056 is configured to multiply the second compensation parameter with the average value of the first filtered capacitance signal to obtain a second product as the compensated average value of the first filtered capacitance signal.

Figure 14:
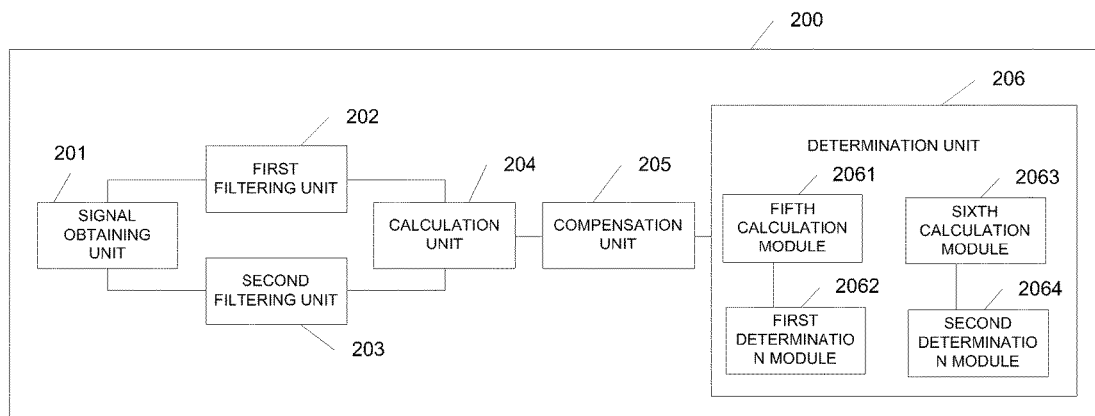
FIG. 14 is a structure schematic diagram of another particular implementation of a device for optimizing a SNR parameter according to an embodiment of the present disclosure.

Further, corresponding to the first way or the third way in the fourth embodiment, the determination unit 206 comprises a fourth calculation module 2061 and a first determination module 2062, as shown in FIG. 14.

The fourth calculation module 2061 is configured to calculate the first ratio of the compensated average value of the second filtered capacitance signal to the average value of the first filtered capacitance signal.

The first determination module 2062 is configured to determine the SNR parameter by a formula:

$$\text{SNR parameter} = 20 \lg(\text{compensated average value of the second filtered capacitance signal/average value of the first filtered capacitance signal}).$$

Alternatively, the determination unit 206 comprises a fifth calculation module 2063 and a second determination module 2064.

The fifth calculation module 2063 is configured to calculate the second ratio of the average value of the second filtered capacitance signal to the compensated average value of the first filtered capacitance signal.

The second determination module 2064 is configured to determine the SNR parameter by a formula:

$$\text{SNR parameter} = 20 \lg(\text{average value of the second filtered capacitance signal/compensated average value of the first filtered capacitance signal}).$$

Various embodiments of the present disclosure are described by further limitation one after another. Same or similar parts in the various embodiments may be referred to each other. What emphasized in each of the embodiments is difference of the present embodiment from others. Especially, since the device embodiments are substantially similar with the method embodiments, the description thereof are simplified and may refer to corresponding description of the method embodiments.

The above descriptions are particular embodiments of the present disclosure. The protection scope of the present disclosure is not limited to this. Various modifications, improvements, expansions and applications which can be made by those skilled in the art based on the embodiments of the present disclosure are to be encompassed by the scope of the present disclosure as defined by the claims and their equivalents.

We claim:

1. A method of optimizing a signal-to-noise ratio (SNR) parameter, comprising steps of:
   obtaining a capacitance signal of a touch screen without being touched and a capacitance signal of the touch screen being touched, respectively;
   filtering the capacitance signal of the touch screen without being touched to obtain a first filtered capacitance signal;
   filtering the capacitance signal of the touch screen being touched to obtain a second filtered capacitance signal;
   calculating an average value of the first filtered capacitance signal in a single period and an average value of the second filtered capacitance signal in the single period;
   compensating the average value of the first filtered capacitance signal or the average value of the second filtered capacitance signal; and
   determining the SNR parameter, according to a first ratio of the compensated average value of the second filtered capacitance signal to the average value of the first filtered capacitance signal and a correspondence between the first ratio and the SNR parameter, or according to a second ratio of the average value of the second filtered capacitance signal to the compensated average value of the first filtered capacitance signal and a correspondence between the second ratio and the SNR parameter.

2. The method according to claim 1, wherein the step of filtering the capacitance signal of the touch screen without being touched to obtain the first filtered capacitance signal comprises:
   filtering the capacitance signal of the touch screen without being touched by a band-pass filter, so as to obtain the first filtered capacitance signal; and
   the step of filtering the capacitance signal of the touch screen being touched to obtain the second filtered capacitance signal comprises: filtering the capacitance signal of the touch screen being touched by the band-pass filter, so as to obtain the second filtered capacitance signal.

3. The method according to claim 1, wherein the step of calculating the average value of the first filtered capacitance signal in the single period and the average value of the second filtered capacitance signal in the single period comprises:
   sampling the first filtered capacitance signal and the second filtered capacitance signal respectively in the single period to obtain multiple sampling points of the first filtered capacitance signal and multiple sampling points of the second filtered capacitance signal;
   calculating an average value of the multiple sampling points of the first filtered capacitance signal in the single period as the average value of the first filtered capacitance signal; and calculating an average value of the multiple sampling points of the second filtered capacitance signal in the single period as the average value of the second filtered capacitance signal.

4. The method according to claim 1, wherein the step of compensating the average value of the second filtered capacitance signal comprises:
obtaining a preset first compensation parameter, the first compensation parameter being no less than 1; and
taking a product of the first compensation parameter and the average value of the second filtered capacitance signal as the compensated average value of the second filtered capacitance signal.

5. The method according to claim 3, wherein the step of calculating the average value of the second filtered capacitance signal in the single period comprises:
dividing, in the single period, the second filtered capacitance signal into N signal sections according to a magnitude of the second filtered capacitance signal, in which N is a positive integer larger than 1;
sampling the N signal sections respectively to obtain N sets of multiple sampling points; and
calculating average values of respective sets of multiple sampling points to obtain N average values of the N signal sections.

6. The method according to claim 5, wherein the step of compensating the average value of the second filtered capacitance signal comprises:
obtaining N section compensation parameters respectively corresponding to N signal sections, wherein each of the N section compensation parameters is no less than 1;
multiplying the N average values with the corresponding N section compensation parameters respectively to obtain N sub-products; and
taking a sum of the N sub-products as the compensated average value of the second filtered capacitance signal.

7. The method according to claim 1, wherein the step of compensating the average value of the first filtered capacitance signal comprises:
obtaining a preset second compensation parameter, the second compensation parameter being no larger than 1; and
multiplying the second compensation parameter with the average value of the first filtered capacitance signal to obtain a second product as the compensated average value of the first filtered capacitance signal.

8. The method according to claim 1, wherein the step of determining the SNR parameter according to the first ratio of the compensated average value of the second filtered capacitance signal to the average value of the first filtered capacitance signal and the correspondence between the first ratio and the SNR parameter, or according to the second ratio of the average value of the second filtered capacitance signal to the compensated average value of the first filtered capacitance signal and the correspondence between the second ratio and the SNR parameter comprises:
calculating the first ratio of the compensated average value of the second filtered capacitance signal to the average value of the first filtered capacitance signal; and
determining the SNR parameter by a formula:

SNR parameter=20 lg(compensated average value of the second filtered capacitance signal/average value of the first filtered capacitance signal); or calculating the second ratio of the average value of the second filtered capacitance signal to the compensated average value of the first filtered capacitance signal; and determining the SNR parameter by a formula:

SNR parameter=20 lg(average value of the second filtered capacitance signal/compensated average value of the first filtered capacitance signal).

9. A device for optimizing a signal-to-noise ratio (SNR) parameter, comprising:
a signal obtaining unit, configured to obtain a capacitance signal of a touch screen without being touched and a capacitance signal of the touch screen being touched, respectively;
a first filtering unit, configured to filter the capacitance signal of the touch screen without being touched to obtain a first filtered capacitance signal;
a second filtering unit, configured to filter the capacitance signal of the touch screen being touched to obtain a second filtered capacitance signal;
a calculation unit, configured to calculate an average value of the first filtered capacitance signal in a single period and an average value of the second filtered capacitance signal in the single period;
a compensation unit, configured to compensate the average value of the first filtered capacitance signal or the average value of the second filtered capacitance signal; and
a determination unit, configured to determine the SNR parameter, according to a first ratio of the compensated average value of the second filtered capacitance signal to the average value of the first filtered capacitance signal and a correspondence between the first ratio and the SNR parameter, or according to a second ratio of the average value of the second filtered capacitance signal to the compensated average value of the first filtered capacitance signal and a correspondence between the second ratio and the SNR parameter.

10. The device according to claim 9, wherein the first filtering unit comprises:
a first band-pass filtering module, configured to filter the capacitance signal of the touch screen without being touched by a band-pass filter, so as to obtain the first filtered capacitance signal; and
the second filtering unit comprises:
a second band-pass filtering module, configured to filter the capacitance signal of the touch screen being touched by the band-pass filter, so as to obtain the second filtered capacitance signal.

11. The device according to claim 9, wherein the calculation unit comprises:
a first sampling module, configured to sample the first filtered capacitance signal and the second filtered capacitance signal respectively in the single period to obtain multiple sampling points of the first filtered capacitance signal and multiple sampling points of the second filtered capacitance signal;
a first calculation module, configured to calculate an average value of the multiple sampling points of the first filtered capacitance signal in the single period as the average value of the first filtered capacitance signal; and
a second calculation module, configured to calculate an average value of the multiple sampling points of the second filtered capacitance signal in the single period as the average value of the second filtered capacitance signal.

12. The device according to claim 9, wherein the compensation unit comprises:
  a first obtaining module, configured to obtain a preset first compensation parameter, the first compensation parameter being no less than 1; and
  a first compensation module, configured to take a product of the first compensation parameter and the average value of the second filtered capacitance signal as the compensated average value of the second filtered capacitance signal.

13. The device according to claim 9, wherein the calculation unit comprises:
  a dividing module, configured to divide, in the single period, the second filtered capacitance signal into N signal sections according to a magnitude of the second filtered capacitance signal, in which N is a positive integer larger than 1;
  a second sampling module, configured to sample the N signal sections respectively to obtain N sets of multiple sampling points; and
  a third calculation module, configured to calculate average values of respective sets of multiple sampling points to obtain N average values of the N signal sections.

14. The device according to claim 13, wherein the compensation unit comprises:
  a second obtaining module, configured to obtain N section compensation parameters respectively corresponding to N signal sections, wherein each of the N section compensation parameters is no less than 1;
  a second compensation module, configured to multiply the N average values with the corresponding N section compensation parameters respectively to obtain N sub-products; and take a sum of the N sub-products as the compensated average value of the second filtered capacitance signal.

15. The device according to claim 9, wherein the compensation unit comprises:
  a third obtaining module, configured to obtain a preset second compensation parameter, the second compensation parameter being no larger than 1; and
  a third compensation module, configured to multiply the second compensation parameter with the average value of the first filtered capacitance signal to obtain a second product as the compensated average value of the first filtered capacitance signal.

16. The device according to claim 9, wherein the determination unit comprises:
  a fourth calculation module, configured to calculate the first ratio of the compensated average value of the second filtered capacitance signal to the average value of the first filtered capacitance signal; and
  a first determination module, configured to determine the SNR parameter by a formula:

SNR parameter=20 lg(compensated average value of the second filtered capacitance signal/average value of the first filtered capacitance signal); or a fifth calculation module, configured to calculate the second ratio of the average value of the second filtered capacitance signal to the compensated average value of the first filtered capacitance signal; and
  a second determination module, configured to determine the SNR parameter by a formula:

SNR parameter=20 lg(average value of the second filtered capacitance signal/compensated average value of the first filtered capacitance signal).

* * * * *